UNITED STATES PATENT OFFICE.

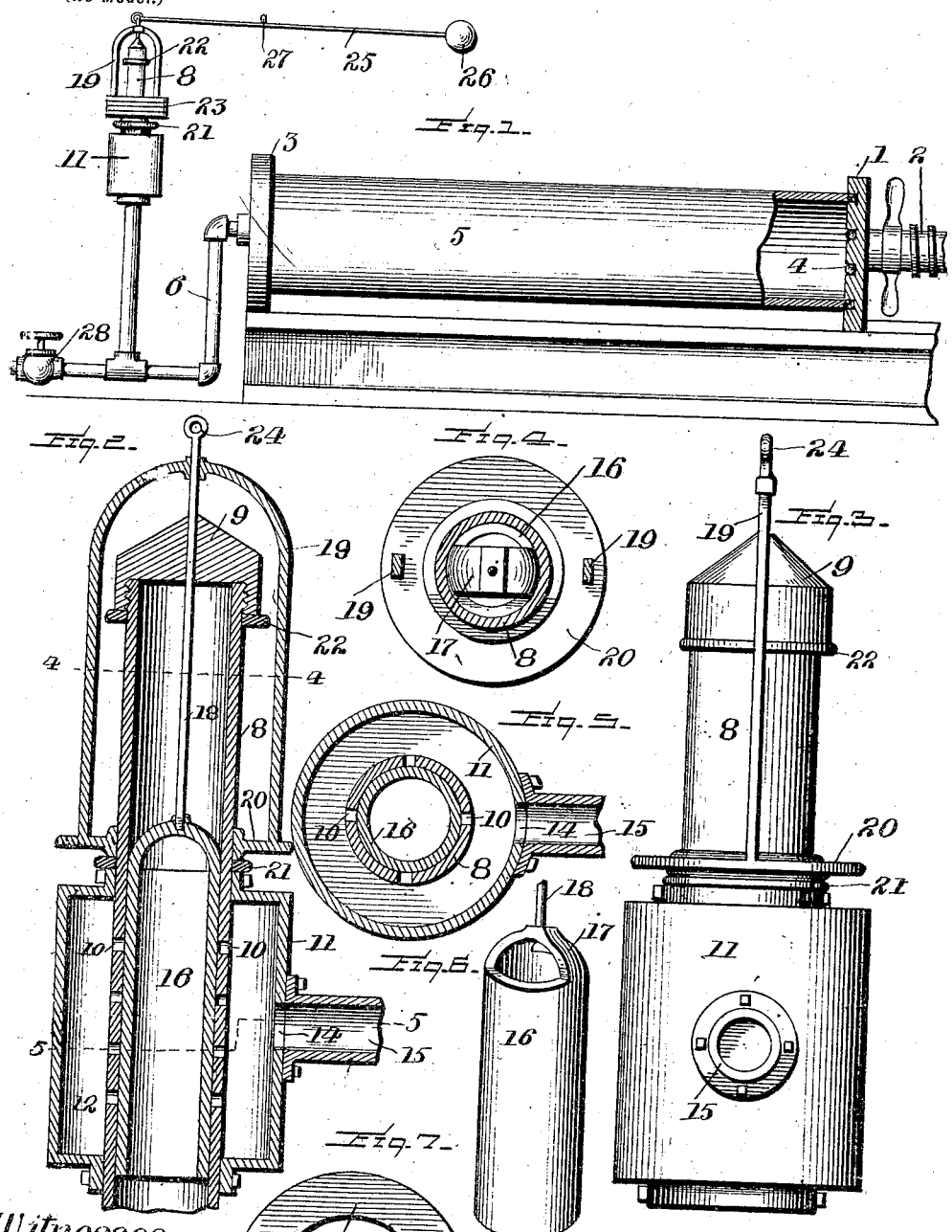

WILLIAM HURRELL, OF McKEESPORT, PENNSYLVANIA.

AUTOMATIC GAGE FOR HYDRAULIC TESTING-MACHINES.

SPECIFICATION forming part of Letters Patent No. 702,216, dated June 10, 1902.

Application filed December 21, 1901. Serial No. 86,804. (No model.)

*To all whom it may concern:*

Be it known that I, WILLIAM HURRELL, a citizen of the United States of America, residing at McKeesport, in the county of Allegheny and State of Pennsylvania, have invented certain new and useful Improvements in Automatic Gages for Hydraulic Testing-Machines, of which the following is a specification, reference being had therein to the accompanying drawings.

This invention relates to certain new and useful improvements in gages, and relates particularly to an automatic gage adapted to relieve pressure at a predetermined point or time, and is particularly adapted for use in connection with the testing of tubes, vessels, or other hollow bodies by hydraulic pressure.

As is well known in the art, tubes of various forms—such as water-gage tubes, tubes for boilers, and many other purposes, as well as various vessels or hollow bodies—are subjected to a strength test before shipment to determine whether the same will withstand the pressure per square inch to which they will be subjected when in use. This test is generally made by hydraulic pressure, and unless the pressure is cut off at exactly the time the "pressure test" has been made the tube or other hollow body is likely to be subjected to an overtest, which is oftentimes fraught with danger.

The main object of my invention, therefore, is to construct a device which when the tube or other hollow body has been subjected to the desired test will automatically relieve the pressure, preventing either overtesting or undertesting of the tube or body; and to this end my invention resides in the novel construction, combination, and arrangement of parts, as will be hereinafter more particularly described, and then specifically pointed out in the claims.

In describing the invention in detail reference will be had to the accompanying drawings, forming a part of this specification, and wherein like numerals of reference will be employed to designate like parts throughout the several views of the drawings, in which—

Figure 1 is a side elevation of my improved automatic gage, showing the application of the same for testing tubes, the latter being shown partly in section to illustrate how it is sealed at the end. Fig. 2 is a central vertical sectional view of my improved automatic gage. Fig. 3 is a side elevation of the same. Fig. 4 is a horizontal sectional view taken on the line 4 4 of Fig. 3, the outlet-pipe for the water being removed. Fig. 5 is a horizontal sectional view taken on the line 5 5 of Fig. 3. Fig. 6 is a detailed perspective view of the vertically-sliding safety-valve. Fig. 7 is a detail plan view of one of the weights which are placed upon the rack to counterbalance the pressure.

In Fig. 1 of the drawings I have shown my improved gage in use for the testing of tubes. In the testing of tubes two sealing-heads are generally employed, and one of these sealing-heads is made movable, so that the tube may be placed in position between the two heads. Various forms of mechanism are employed for this purpose, so I have simply shown an operative construction in order to illustrate my invention. The sealing-head 1 I have shown connected to a screw 2, and this sealing-head, together with the opposite sealing-head 3, is provided on its inner face with one or more grooves circumferentially arranged therein, and in this groove or grooves is placed a suitable packing 4, generally composed of rope. These heads are generally constructed so that the same heads may be employed for various-sized tubes. In testing vessels or hollow bodies which are closed at one end the head 1 will be made of a form to support the closed end of the vessel or other body. When testing tubes, the ends of the tube 5 are placed against the rope packing 4 and the head 1 then tightened, so as to firmly seal the tube at both ends except for the opening in the head 3, through which water under pressure is admitted. This sealing-head 3 is connected by a pipe 6 to a suitable source of pressure-supply, such as a pump. (Not shown.) Connected to this pipe 6, as by a union 7, and extending upward vertically therefrom is a pipe or tube 8, the upper end of which is provided with threads to receive a cap 9. This tube or pipe constitutes a part of my improved automatic gage, which I will now describe. This tube or pipe is provided intermediate its ends with a series of perforations 10, (in the present illustration sixteen of these openings being shown,) they being placed on four opposite sides of the tube. Around this perforated portion of the tube is placed a hood 11 of considerably greater diameter than the tube, so as to form an annular chamber 12, having a discharge-port 14, through which the excess pressure is conducted to the discharge-pipe 15, connected onto the hood. In practice this discharge-port and discharge-pipe are of a diameter equal or about equal to the diameter of the tube or pipe 8. Fitted to slide neatly within the perforated portion of the tube or pipe 8 is a hollow cylindrical safety-valve 16, to the upper end of which a stem 18 is connected by an arch 17 or in other suitable manner. This stem 18 extends through the cap 9 and is connected above the cap to a rack 19, which has a base 20, that slides neatly upon the tube or pipe 8, flexible gaskets 21 22 being placed upon the tube or pipe to prevent battering of the base of rack either upon the top of hood or against lower end of cap 9. This rack is adapted to receive one or more counterbalance-weights 23, as shown in detail in Fig. 7. The stem 18 is or may be provided in its upper end with an eye 24, to which a counterbalance-lever 25 is connected, this lever having a weight 26 on its free end and being supported by a rod 27 or other suitable means from overhead the device. This counterbalance is only employed for counterbalancing the weight of the safety-valve 16, its stem, and the rack 19, so as to permit of testing at low pressures.

For illustration, we will assume that valve 28, Fig. 1, is open so as to admit pressure into tube 6. When the pressure in this tube accumulates to the number of pounds per square inch for which the gage is set, it reacts in the tube or pipe 8, causing valve 16 to rise and allowing superfluous pressure to escape through the openings 10 into the chamber 12, discharge-port 14, and pipe 15. From the fact that pressure is admitted freely to the pipe 8 both above and below the safety-valve 16 the pressure acts only on an area equal to a cross-section of the stem 18, and consequently the weights on the rack 19 need only bear the same ratio to the number of pounds per square inch at which it is desired to test the tube 6 as the area of a cross-section of the stem 18 bears to one square inch. For example, let it be supposed that the area of a cross-section of the stem 18 is equal to $b$ and it is desired to test the tube 5 at $d$ pounds per square inch. Then as one is to $b$ so is $d$ to weight on rack, or let it be supposed that the area of a cross-section of the stem 18 is equal to one twenty-fifth of a square inch and it is desired to test the tube 5 at seven hundred and fifty pounds pressure per square inch. Then as one is to one twenty-fifth so is seven hundred and fifty to weight on rack equal to thirty, or $\frac{1}{25} = \frac{750}{30}$.

For testing a tube or other hollow body at fifteen hundred pounds per square inch an additional weight 23 would be placed on the rack 19, and when testing at low pressures, with the weights removed, the counterbalance-weight is employed for counterbalancing the weight of the safety-valve, its stem, and rack. By this means it will be observed that overtesting of the tube or other hollow body is impossible, as when the excess pressure immediately acts upon the safety-valve to raise same and permit pressure to escape. The tube or pipe 8 is preferably perforated in lieu of providing one large outlet in same, as I have found the same to be stronger when so constructed, these perforations being made of a size so that the area of all will equal the area of the tube 8.

While I have herein illustrated my invention as applicable for use in testing tubes or other hollow bodies, yet I do not wish to be limited to such use for same, as it will be noted that this form of gage is equally applicable in any connection where it is desired to permit an escape of excess pressure.

Having fully described my invention, what I claim as new, and desire to secure by Letters Patent, is—

1. In combination with a pressure-supply pipe, an automatic pressure-relieving gage comprising a tube having its lower end connected to said supply-pipe and provided with a discharge-outlet intermediate its ends, a hollow cylindrical valve provided at its upper end with an arch formed integral therewith, whereby pressure is admitted both above and below the said valve and a weight-receiving rack mounted on the tube and connected to the said valve, substantially as described.

2. In combination with a pressure-supply, a tube directly connected thereto, said tube closed at its outer end and provided with a discharge-port, a cylindrical valve hollow for its entire length fitted to slide in the tube and provided at its upper end with an arched portion and a stem connected to the said arched portion extending through the closed end of the tube, a weight-receiving rack fitted to slide on the tube and secured to said stem, and a counterbalance-lever connected to the said stem, substantially as described.

3. In an automatic pressure-gage, the combination of a tube in direct communication with the pressure-supply and provided in its wall with a series of vertically-arranged openings, a valve having closed walls and open ends fitted in the tube to normally close one or more of the said openings, a band arching and formed integral with the upper end of said valve, a stem connected to the said arched band and having its upper end extending through the closed outer end of the tube, and a weight-receiving rack fitted to slide on said tube and secured to the said stem, substantially as described.

4. In an automatic pressure-gage, the combination with the pressure-supply, of a tube having a closed outer end and having its lower end in communication with the pressure-supply, said tube provided in its wall intermediate its ends with a series of vertically-arranged openings, a hood detachably secured to the said tube and inclosing the said openings, said hood provided in its side with an exhaust-port, a hollow cylindrical valve fitted to slide in said tube and provided at its upper end with an integral arch, a stem connected to the said arch and extending through the closed end of the said tube, and a weight-receiving rack arching the upper end of the tube and having its lower end encircling the tube, and slidably mounted therein, said rack being rigidly secured to the said stem, substantially as described.

5. In combination with a pressure-supply pipe, a tube connected to said supply-pipe and provided with a discharge-outlet, a valve slidably mounted in said tube, means whereby pressure is admitted both above and below the said valve, a stem connected to the said valve, and a counterbalance connected to the said stem.

6. In combination with a pressure-supply pipe, a tube connected to said supply-pipe and provided with a discharge-outlet intermediate its ends, a detachable hood inclosing the said outlet and provided with an exhaust-port, a valve provided with closed side walls and open ends slidably mounted in said tube, a transversely-arranged portion secured across the bore of the said valve, a stem connected to the said valve, and means for holding the said valve in its adjusted position.

7. In combination with a pressure-supply, a tube, said tube having its outer end closed and its inner in direct communication with the pressure-supply, and formed intermediate its ends with a discharge-port, a valve slidably mounted in said pipe, means whereby pressure is admitted both above and below the said valve, an annular hood inclosing the said discharge-port, and provided with an exhaust-port, a weight-rack slidably mounted on said tube, means for limiting the movement of the said rack, and a stem connecting the said valve with the said rack.

In testimony whereof I affix my signature in the presence of two witnesses.

WILLIAM HURRELL.

Witnesses:
JOHN NOLAND,
E. E. POTTER.